United States Patent
Tang et al.

(10) Patent No.: US 7,957,921 B2
(45) Date of Patent: Jun. 7, 2011

(54) MODEL-BASED ESTIMATION OF BATTERY HYSTERESIS

(75) Inventors: Xidong Tang, Sterling Heights, MI (US); Xiaodong Zhang, Mason, OH (US); Yuen-Kwok Chin, Troy, MI (US); Brian J. Koch, Berkley, MI (US); Damon R. Frisch, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 347 days.

(21) Appl. No.: 12/033,197

(22) Filed: Feb. 19, 2008

(65) Prior Publication Data

US 2009/0210179 A1 Aug. 20, 2009

(51) Int. Cl.
*G06F 19/00* (2006.01)
(52) U.S. Cl. ......... 702/63; 702/183; 320/132; 320/136
(58) Field of Classification Search .............. 702/63, 702/64, 65, 183; 320/132, 136
See application file for complete search history.

(56) References Cited

U.S. PATENT DOCUMENTS

| | | | | |
|---|---|---|---|---|
| 4,396,880 A * | 8/1983 | Windebank | | 320/156 |
| 6,359,419 B1 | 3/2002 | Verbrugge et al. | | |
| 6,362,598 B2 * | 3/2002 | Laig-Horstebrock et al. | | 320/132 |
| 6,441,586 B1 * | 8/2002 | Tate et al. | | 320/132 |
| 6,515,454 B2 * | 2/2003 | Schoch | | 320/132 |
| 6,639,385 B2 * | 10/2003 | Verbrugge et al. | | 320/132 |
| 7,012,434 B2 * | 3/2006 | Koch | | 324/427 |
| 7,216,044 B2 * | 5/2007 | Kato et al. | | 702/63 |
| 7,332,892 B2 * | 2/2008 | Bopp et al. | | 320/132 |
| 7,375,497 B2 * | 5/2008 | Melichar | | 320/132 |
| 7,446,504 B2 * | 11/2008 | Plett | | 320/132 |
| 7,656,123 B2 * | 2/2010 | Plett | | 320/132 |
| 7,764,049 B2 * | 7/2010 | Iwane et al. | | 320/136 |
| 2003/0169049 A1 * | 9/2003 | Kawaguchi et al. | | 324/426 |
| 2003/0195719 A1 * | 10/2003 | Emori et al. | | 702/183 |

FOREIGN PATENT DOCUMENTS

| | | | |
|---|---|---|---|
| CA | 1185319 A1 | | 9/1985 |
| DE | 102005026597 A1 | * | 12/2006 |
| EP | 1243933 A1 | | 9/2002 |

OTHER PUBLICATIONS

M. W. Verbrugge and E. D. Tate, Adaptive state of charge algorithm for nickel metal hydride batteries including hysteresis phenomena, Journal of Power Sources, vol. 126, pp. 236-249, 2004.
M. W. Verbrugge, D. Frisch, and B. Koch, Adaptive energy management of electric and hybrid electric vehicles, Journal of the Electrochemical Society, vol. 152, No. 2, pp. A333-A342, 2005.
X. Tan and J. S. Baras, Adaptive Identification and Control of Hysteresis in Smart Materials, IEEE Transactions on Automatic Control, vol. 50, No. 6, pp. 827 839, 2005.
D. Croft, G. Shed, and S. Devasia, Creep, Hysteresis, Vibration Compensation for Piezoactuators:Atomic Force Microscopy Application, Journal of Dynamic Systems, Measurement, and Control, vol. 123, pp. 35 43, 2001.
D. Hughes and J. Wen, Preisach Modeling of Piezoceramic and Shape Memory Alloy Hysteresis, Smart Mater. Struct. 6, pp. 287-300, 1997.
Mayergoyz, I. D., Chapter 1: The Classical Preisach Model of Hysteresis, Mathematical Models of Hysteresis, 1991, pp. 7-26, Springe-Verlag, New York.

* cited by examiner

*Primary Examiner* — Carol S Tsai

(57) ABSTRACT

A method of battery state of charge estimation considering battery hysteresis includes using a Preisach-model-based algorithm to calculate a battery state of charge.

10 Claims, 13 Drawing Sheets

US 7,957,921 B2

MODEL-BASED ESTIMATION OF BATTERY HYSTERESIS

TECHNICAL FIELD

This disclosure is related to battery hysteresis estimation for battery state of charge estimation.

BACKGROUND

Accurate and reliable determination of battery state of charge is essential to electric power management, fuel economy, and battery life. Battery state of charge is difficult to measure directly. One known method to measure battery state of charge is to infer the state of charge from the open circuit voltage. However, such known methods have accuracy shortfalls. Open circuit voltage-based state of charge estimation is influenced by battery hysteresis. Chemical processes internal to the battery create history dependant characteristics which influence battery performance. For any open circuit voltage, a range of states of charge may exist, depending on the conditions created by past charging and discharging cycles. Estimating the state of charge of a battery on the basis of open circuit voltage or similar electrical system properties would benefit from a method to evaluate and calculate the effects of historical charging and discharging cycles upon state of charge.

SUMMARY

A method of battery state of charge estimation considering battery hysteresis includes using a Preisach-model-based algorithm to calculate a battery state of charge.

BRIEF DESCRIPTION OF THE DRAWINGS

One or more embodiments will now be described, by way of example, with reference to the accompanying drawings, in which.

DETAILED DESCRIPTION

Figure 1:
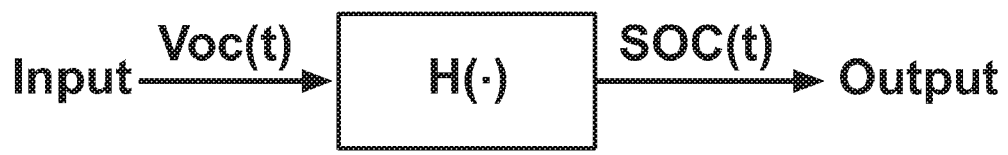
FIG. 1 is a block diagram exemplifying an embodiment of a hysteresis model in accordance with the disclosure.

Referring now to the drawings, wherein the showings are for the purpose of illustrating certain exemplary embodiments only and not for the purpose of limiting the same, FIG. 1 illustrates a block diagram of an exemplary embodiment of a hysteresis model in accordance with the disclosure. An input, in this particular embodiment, an open circuit voltage ("Voc"), is fed through a hysteresis model represented as H(•), and an output, in this particular embodiment, a state of charge ("SOC"), is generated. SOC is a term of art used to describe the level of stored energy available in a battery. Voc is a measure of voltage that a battery would provide if all circuit connections were removed from the battery terminals. However, Voc is difficult to measure in an operating system and may instead be estimated by readily measurable system parameters, as will be discussed below. Hysteresis describes the behavior of a system in which the output of the system is dependant upon historical states. SOC exhibits behavior typical to hysteresis, in that SOC available at any time is dependent upon historical charge and discharge cycles.

Figure 2:
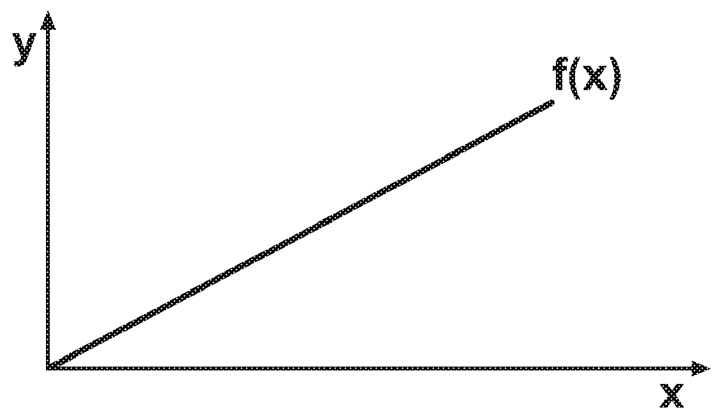
FIG. 2 is a graphical illustration of an exemplary known function in accordance with the disclosure.
Figure 3:
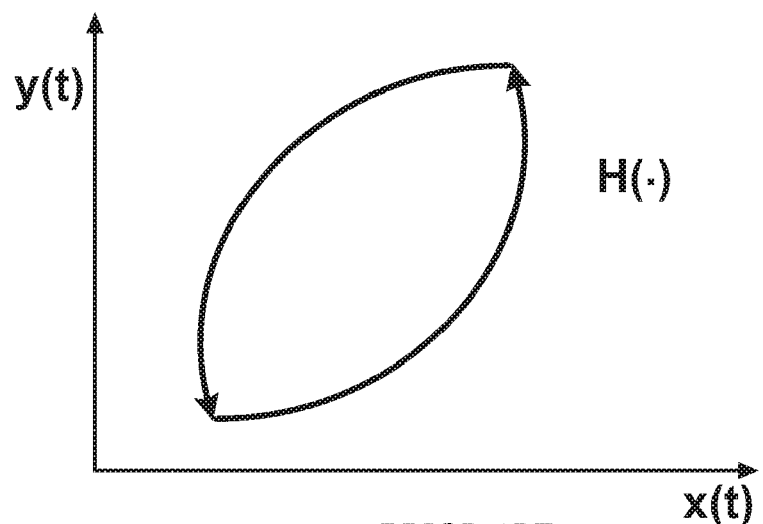
FIG. 3 is a graphical illustration of an exemplary hysteresis model in accordance with the disclosure.

FIG. 2 graphically illustrates the behavior of a typical function f(x). In this function, x is an input and y is an output. The function f(x) describes the behavior such that for a given x, y is a unique value. Models representing a system displaying hysteresis cannot supply a unique output value for a given input. FIG. 3 illustrates a system displaying hysteresis. The input x(t) generates an output y(t) which may be described by the model H(•). The output is dependant upon whether the input is increasing or decreasing, and the output is also dependant upon where within H(•) past cycles have ended.

Figure 4:
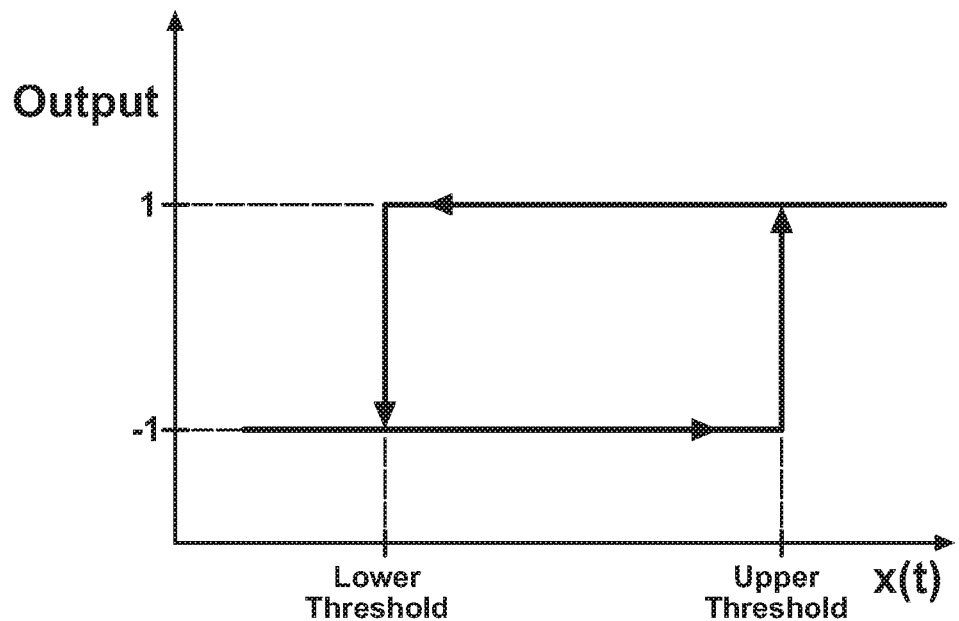
FIG. 4 is a graphical illustration of the operation of an exemplary elementary hysteron in accordance with the disclosure.

A widely accepted model used to depict the properties of hysteresis is the Preisach model. The Preisach model is well known in the art and will not be described in detail herein; however, aspects of the Preisach model most pertinent to the present disclosure are illustrated in FIGS. 4-11. FIG. 4 illustrates the behavior of an element basic to the Preisach model known as an elementary hysteron. An elementary hysteron is used to describe an element capable of a binary output of minus one or one on the basis of an input x(t). Beginning with an x(t) anywhere below the upper threshold, the output remains minus one. Only when x(t) exceeds the upper threshold will the output shift to one, where the output will remain one until x(t) becomes less than the lower threshold. For any value of x(t) below the lower threshold, the output is known to be minus one, while for any value of x(t) above the upper threshold, the output is known to be one. For any value of x(t) between the upper and lower thresholds, the output is dependant upon which threshold was last crossed.

Figure 5:
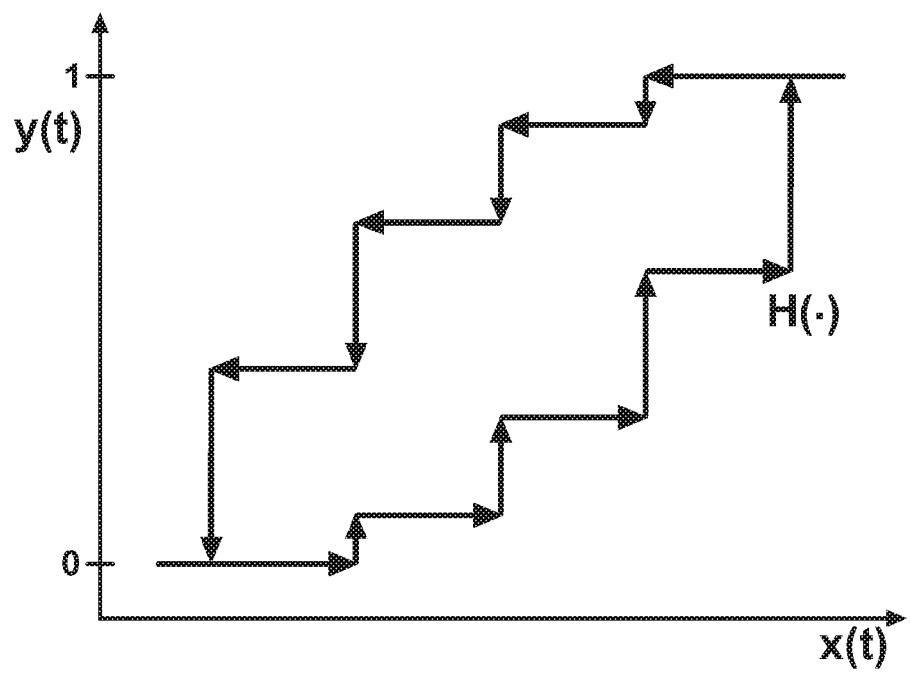
FIG. 5 is a graphical illustration of the operation of an exemplary ideal system displaying hysteresis in accordance with the disclosure.

FIG. 4 illustrates a single elementary hysteron of the Preisach model. Most Preisach models consist of multiple elementary hysterons added together, with the multiple thresholds acting one after the other to describe alternative behaviors, depending upon whether the input is increasing or decreasing. In such a Preisach model, the elementary hysterons act as binary switches, affecting the output as individual thresholds corresponding to each elementary hysteron are reached. FIG. 5 illustrates an example of such a Preisach model H(•) which is a summation of multiple elementary hysterons with appropriate weights and shifting. The weight is a measure of the contribution of each elementary hysteron input of −1 or 1 to the overall movement of the output. In this case y(t) moves from 0 to 1; the weights for 10 elementary hysterons to affect a change of 1 are 0.05, assuming all the elementary hysterons contribute the same to the output y(t). Shifting is a measure of how much must be added to the scaled elementary hysteron outputs to reach the desired minimum and maximum values of the output. A weighted group of hysterons in this case with no shifting would yield an output of −0.5 to 0.5; therefore shifting of 0.5 is required in this case. H(•) describes the behavior of output y(t) depending upon whether input x(t) is increasing or decreasing. On the increasing portion of H(•), when y(t) equals zero, it can be said that all of the elementary hysterons of H(•) are switched off. As x(t) begins to increase, y(t) remains flat at zero until x(t) reaches a first threshold. As x(t) continues to increase, y(t) continues to increase in steps until y(t) finally reaches its apex at one. When y(t) equals one, it may be said that all elementary hysterons of H(•) are switched on. As x(t) experiences a reversal and the value of x(t) which had been increasing begins to decrease, the opposite behavior takes place, wherein individual elementary hysterons remained switched on until their individual thresholds are achieved. As x(t) decreases, y(t) decreases in steps as individual elementary hysterons are switched off until y(t) reaches zero. The number of elementary hysterons used in H(•) may be increased to describe more fluidly the behavior of particular systems affected by hysteresis. Additionally, it should be noted that the shape of the curve depicted shows a pattern of behavior typical to an idealized system, and in actual systems, the curve will likely take other shapes indicative of non-ideal system behaviors by weighting individual elementary hysterons differently.

Figure 6:
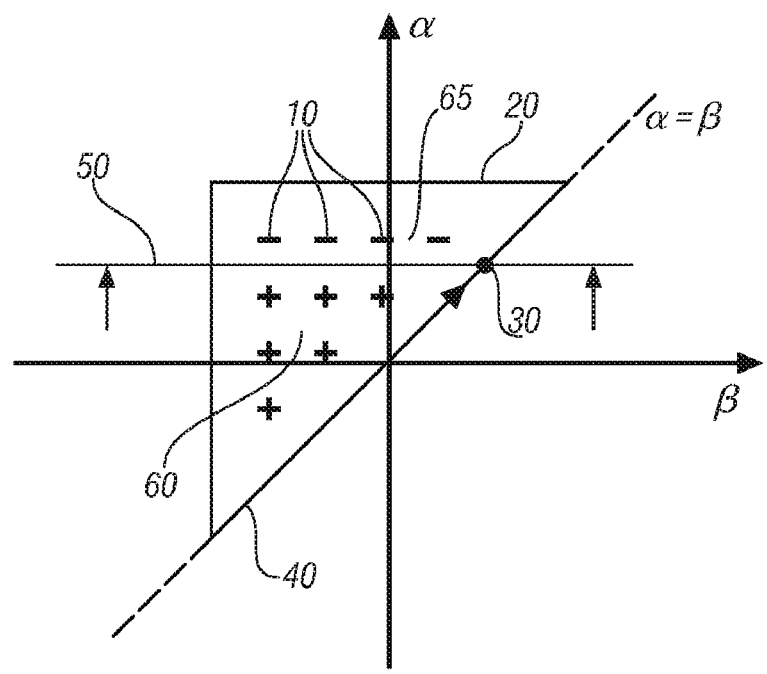
FIG. 6 displays an exemplary system operating with an increasing input in accordance with the disclosure.

Another graphic used to describe the operation of a Preisach model H(•) based on a memory curve. The operation of an exemplary memory curve is illustrated in FIGS. 6-10. Axis $\alpha$ describes an increasing x(t) value and axis $\beta$ describes a decreasing x(t) value. Referring to FIG. 6, the triangle, referred to as a Preisach plane 20, represents an area whereon elementary hysterons 10 are defined. Output y(t) may be calculated at any time as the summation of elementary hysterons on the entire Preisach plane 20 with appropriate weights and shifting. A diagonal line 40 from lower left to upper right represents a line whereon $\alpha = \beta$. Changes to x(t) are represented by a point 30 slidingly fixed to $\alpha = \beta$ line 40. Referring momentarily back to FIG. 5, small x(t) values exist where y(t)=0 and all elementary hysterons 10 are switched off. Referring to FIG. 6, such a small x(t) number would be represented by a point 30 on $\alpha = \beta$ line 40 on the lower left hand extreme of $\alpha = \beta$ line 40. For any increase in x(t), a horizontal line 50 extending through Preisach plane 20 at the level of point 30 on $\alpha = \beta$ line 40 is constructed. As x(t) increases, point 30 moves up and to the right on $\alpha = \beta$ line 40 and horizontal line 50 moves correspondingly up, and any elementary hysterons 10 falling below horizontal line 50 are switched on. An exemplary method for describing the operation of a Preisach model H(•) defines a region 60, sometimes referred to in the art as $A^+$, containing switched on elementary hysterons (designated "+" in FIG. 6) and another region 65, sometimes referred to in the art as $A^-$, containing switched off elementary hysterons (designated "−" in FIG. 6), these two areas adding together to include the entire Preisach plane 20. As x(t) continues to increase, point 30 on $\alpha = \beta$ line 40 will continue to move up and to the right, and region 60 under the horizontal line 50 will increase, and inevitably more elementary hysterons will be switched on, thereby increasing $A^+$ and decreasing $A^-$. Using FIG. 6 as an example for calculating y(t) as the summation of elementary hysterons 10 on the entire Preisach plane 20 and carrying through the exemplary weights and shifting from FIG. 5 reflecting maximum and minimum output y(t) values of 1 and 0, FIG. 6 depicts a system with six out of ten elementary hysterons switched on (each with an output of one) and four out of ten switched off (each with an output of minus one). Therefore, the value of y(t) for the exemplary conditions in FIG. 6 would be (6×1+ 4×(−1))×0.05+0.5=0.6, where one is the output of the six elementary hysterons switched on, minus one is the output of the four elementary hysterons switched off, 0.05 is the weights for all the ten elementary hysterons, and 0.5 is the shifting.

Figure 7:
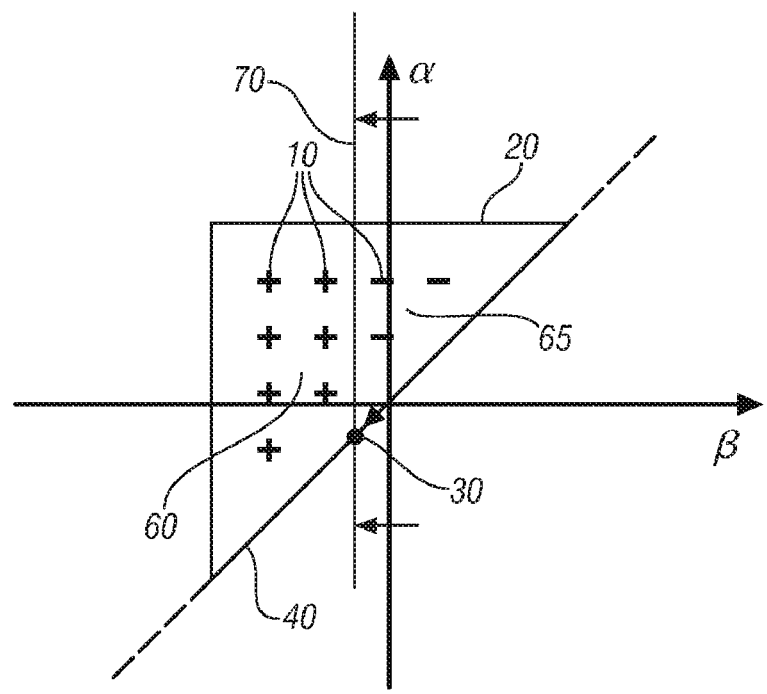
FIG. 7 displays an exemplary system operating with a decreasing input in accordance with the disclosure.

FIG. 7 illustrates the reverse procedure for tracking a decrease in x(t). Note that this exemplary embodiment assumes that the situation depicted in FIG. 6 was carried through such that point 30 was moved to the extreme upper right hand side of $\alpha = \beta$ line 40 and that, as a result, region 60 increased and became coincident with Preisach plane 20. For any decrease in x(t), point 30 on $\alpha = \beta$ line 40 will move down and to the left on $\alpha = \beta$ line 40. For any decrease in x(t), a vertical line 70 is constructed at point 30 through Preisach plane 20. As x(t) decreases, line 70 will move to the left, and any portion of the Preisach plane 20 to the right of line 70 is subtracted from region 60 and added to region 65. Any elementary hysterons 10 to the right of line 70 correspond to a reducing y(t) value, and the relationship of elementary hysterons 10 switched on and elementary hysterons 10 switched off to the value of y(t) as described above continues to operate. Because FIG. 7 depicts a system with seven out of ten elementary hysterons switched on (with an output of one) and three out of ten switched off (with an output of minus one), the value of y(t) for the exemplary conditions in FIG. 7 would be (7×1+3×(−1))×0.05+0.5=0.7. As x(t) would continue to decrease, vertical line 70 would continue to move to the left until region 60 reduced to zero and all elementary hysterons 10 would be outside region 60.

Figure 8:
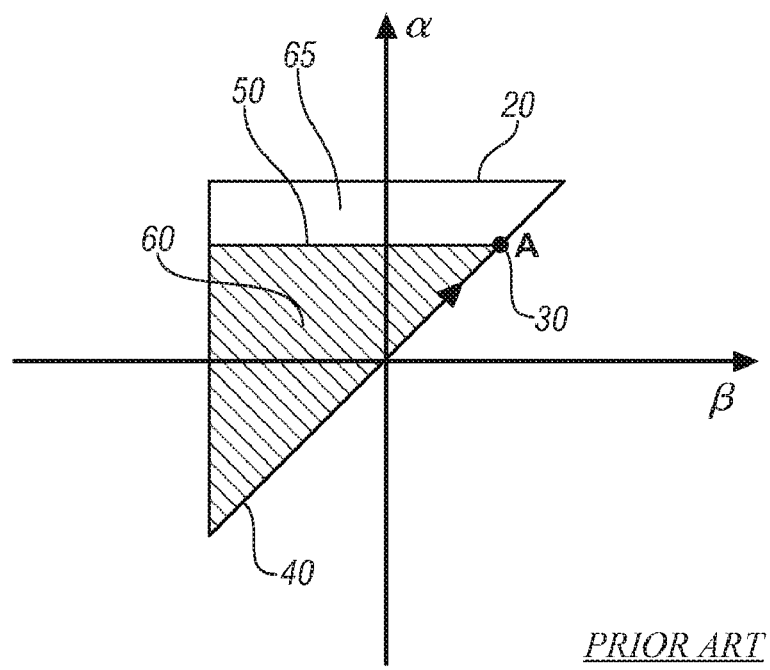
FIG. 8 displays an exemplary system operating with an increasing input in accordance with the disclosure.
Figure 9:
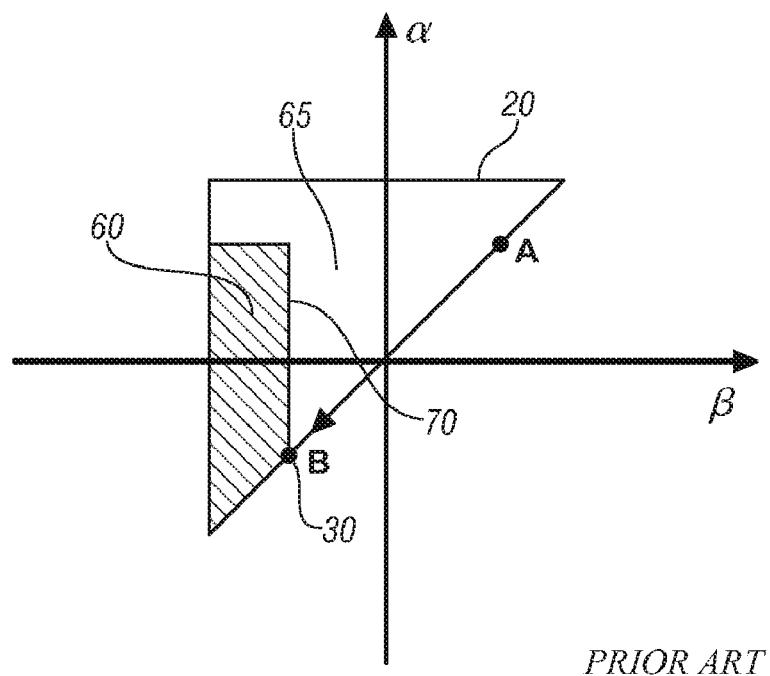
FIG. 9 displays an exemplary system operating with a decreasing input, in accordance with the disclosure.
Figure 10:
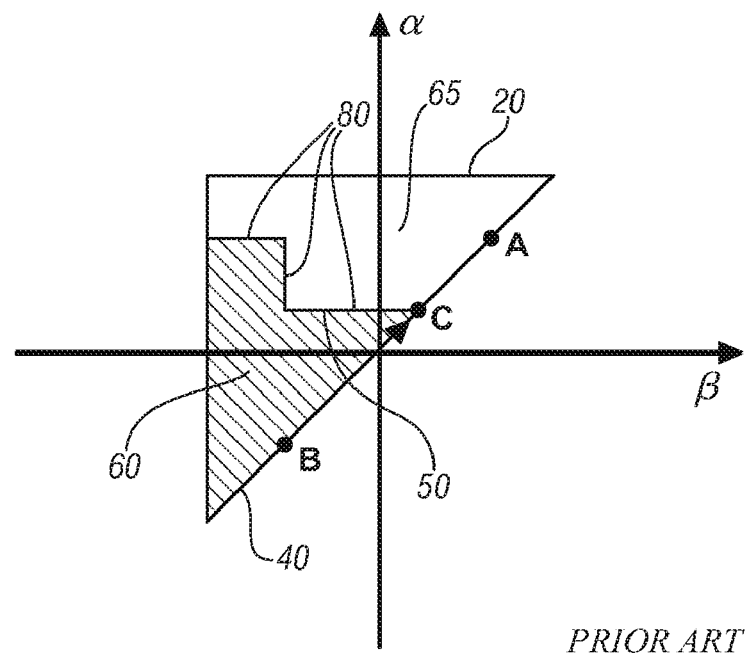
FIG. 10 displays an exemplary system operating with an increasing input, in accordance with the disclosure.

In the preceding situations depicted in FIGS. 5-7, the x(t) values started at one extreme and moved entirely to the other extreme. The resulting memory curve in FIG. 5 resulted in an increasing line curving from the lower left to the upper right and a decreasing line curving from the upper right to the lower left. The corresponding memory curves in FIGS. 6-7, displayed first a horizontal line 50 and then a vertical line 70 sweeping from one side of the Preisach plane 20 to the other, increasing or decreasing region 60 or $A^+$ in totality. However, x(t) need not move from one extreme to the other, and memory curves are useful in quantifying hysteron states in partial x(t) movements. FIGS. 8-10 illustrate the form that regions 60 and 65 take with partial movements of x(t) and the states of elementary hysterons resulting from the partial movements. FIG. 8 depicts x(t) increasing from a initially small number to some value A. As described in FIG. 6, horizontal line 50 moves up with point 30 on α=β line 40, defining region 60 (shaded) on Preisach plane 20 capturing elementary hysterons, thereby describing a value for y(t) as A⁺ increases and A⁻ decreases. Region 60 in FIG. 8 includes all of Preisach plane 20 below horizontal line 50. FIG. 9 depicts x(t) subsequently decreasing from value A to some value B. Vertical line 70 is formed, and as the line moves to the left, region 60, describing A⁺, decreases in size, losing any portion of Preisach plane 20 to the right of vertical line 70. Because x(t) only decreased to value B, the area remaining to the left of point 30 at B remains part of region 60. FIG. 10 depicts x(t) subsequently increasing from value B to some value C. Horizontal line 50 is formed, and as the line moves up, region 60 on Preisach plane 20 describing A⁺ increases in size. Because value C is less than value A, line 80 defining the boundary of region 60 is stepped. As previously described, the relationship of elementary hysterons 10 switched on and elementary hysterons 10 switched off to the value of y(t) described by A⁺ and A⁻ continues to operate.

Figure 11:
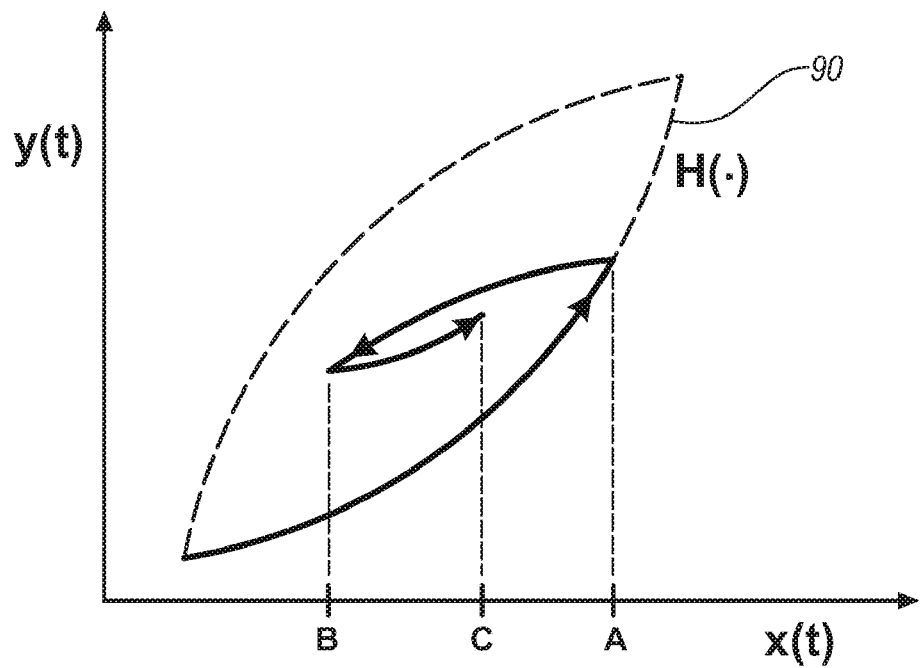
FIG. 11 is a graphical illustration of the operation of an exemplary ideal system displaying hysteresis in accordance with the disclosure.

A system displaying hysteresis undergoing partial movements of x(t) may be displayed in terms of H(•) and resulting y(t) values. FIG. 11 illustrates an exemplary system undergoing partial movements of x(t) similar to the steps illustrated in FIGS. 8-10. As mentioned previously, the number of elementary hysterons in a model may be varied to add or subtract resolution from the calculation of y(t). FIG. 11 replaces the ten discrete elementary hysterons as modeled in the examples of FIGS. 8-10 with a larger number of elementary hysterons such that the resulting H(•) curve appears to be continuous. In FIG. 11, we see x(t) starting at some small number and increasing to some value A. The output y(t) value operates as y(t) had in the previous example in FIG. 5, increasing slowly at first and then gradually sloping upward. However, unlike in the H(•) curve illustrated in FIG. 5, x(t) in this exemplary embodiment stops increasing at value A and begins to decrease to some value B. Dotted line 90 depicts the boundary condition which H(•) would have followed had x(t) increased to its extreme value. Instead, H(•) mimics H(•) in FIG. 5 at its reversal point, y(t) initially decreasing slowly at first and then gradually sloping downward. As x(t) reaches value B, x(t) stops decreasing and begins to increase to some value C. H(•) again mimics previous patterns, y(t) increasing slowly at first and gradually increasing in slope as it reaches value C. In this way, the Preisach model may be used to estimate the behavior of systems displaying properties of hysteresis.

Figure 12:
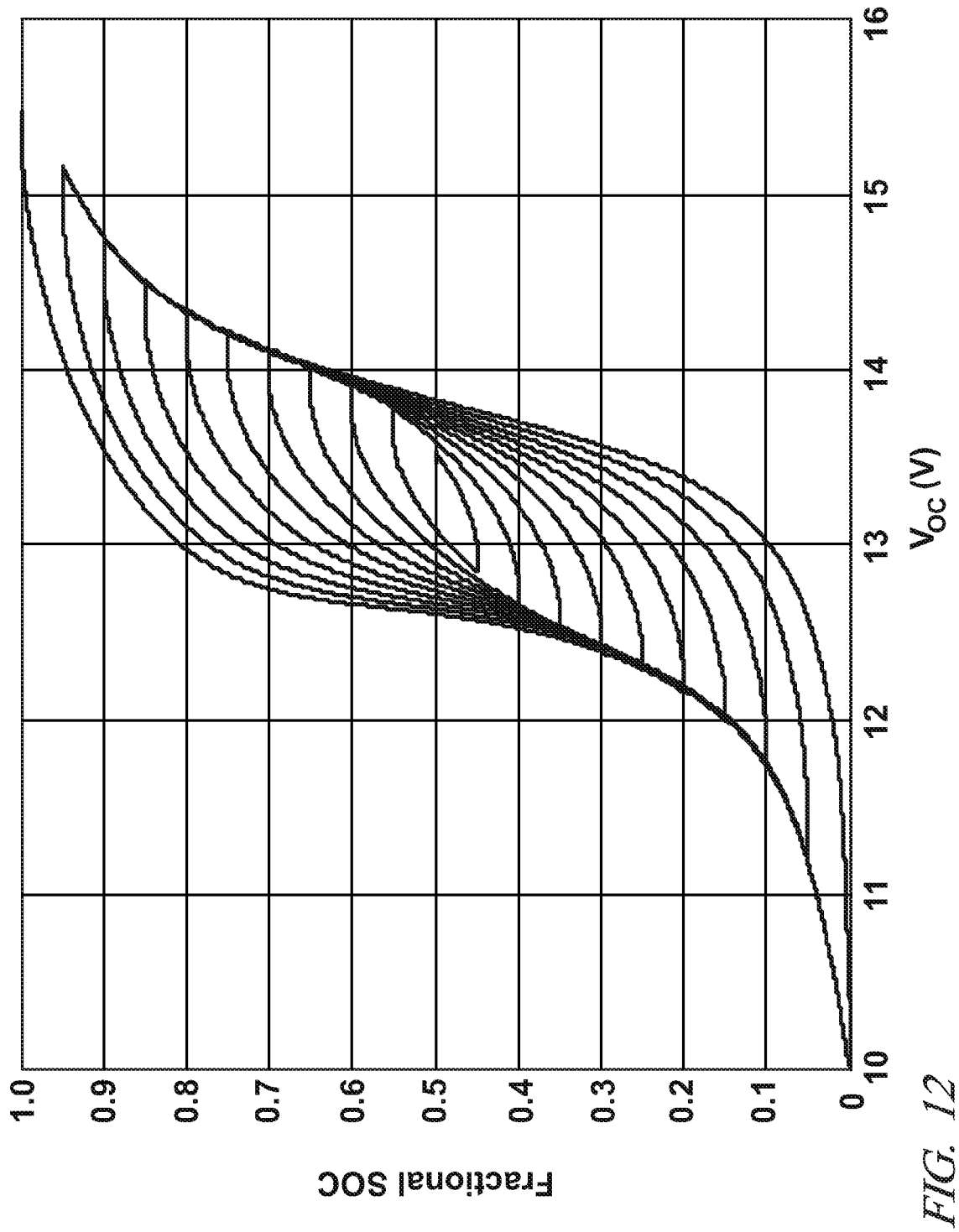
FIG. 12 is test data starting from 100% SOC with a decreasing depth of discharge and charge in accordance with the disclosure.
Figure 13:
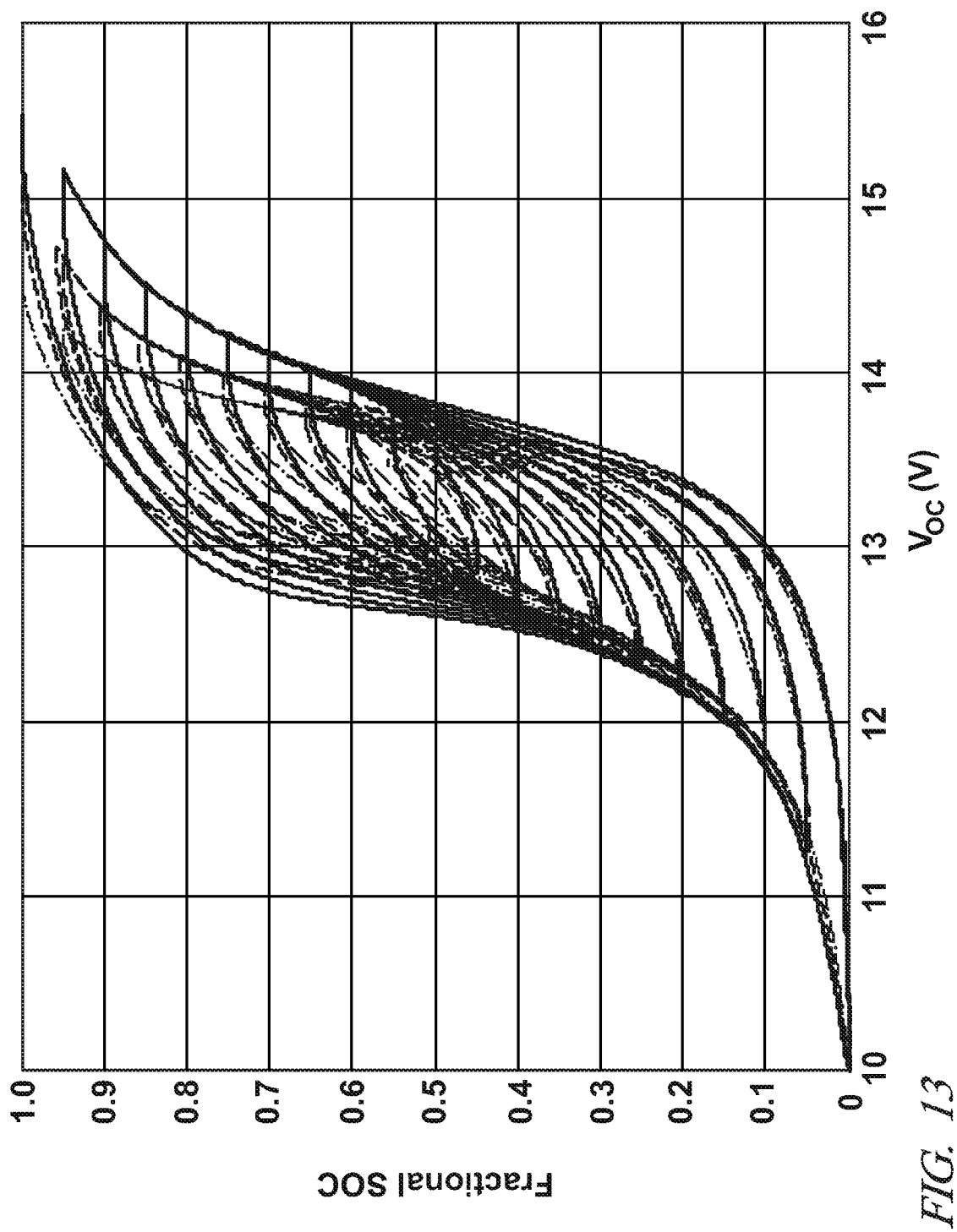
FIG. 13 is test data indicating battery hysteresis dependent on temperature in accordance with the disclosure.

Testing has shown that battery state of charge displays properties of hysteresis through charge and discharge cycles. FIGS. 12 and 13 illustrate graphically results of tests taken over multiple charging and discharging cycles of exemplary NiMH batteries. FIG. 12 exhibits a set of rings displaying boundary and internal hysteresis loops of H(•), whereas FIG. 13 exhibits three sets of rings displaying boundary and internal hysteresis loops of H(•) at different temperatures. The plots show that the output SOC(t) is not functionally determined by a Voc value, but instead SOC(t) varies depending upon whether the battery has most recently been charged or discharged and depending upon the historical state of the battery. FIGS. 12 and 13 demonstrate an actual system behaving as predicted by FIG. 11.

As described above, an ideal output y(t) such as is displayed in FIG. 11 may be estimated by applying a Preisach hysteresis model H(•), described by a set of elementary hysterons, to a set of weights and a shifting factor describing y(t) as its value moves between a maximum y(t) value and a minimum y(t) value. Each hysteron state may be described by a hysteron state indicator w. In order to describe the states of the elementary hysterons within a model, an n-dimensional vector w(t) may be defined to describe the states of the specific elementary hysterons, such that $w(t)=[w_1, w_2, \ldots, w_k, \ldots, w_n]^T$, wherein n equals the number of elementary hysterons. This description of hysteron states w(t), multiplied by a set of weights defined by $\mu=[\mu_1, \mu_2, \ldots, \mu_k, \ldots, \mu_n]^T$ which is a weight vector of the same dimension as the state vector w, may be used to describe the output of an ideal system. Given all the weights to be the same, this calculation yields an even oval shaped pattern as shown in FIG. 11 with a low value at the minimum value of y(t) and a high value at the maximum value of y(t).

Non-ideal systems, such as those reflected in FIGS. 12 and 13, do not form an even pattern as in FIG. 11. A method to account for inefficiencies inherent to non-ideal systems is to apply a unique weight to each elementary hysteron, reflecting the distorting effects of the inefficiencies. A weight for an elementary hysteron is a measure of the contribution of that elementary hysteron to the overall hysteresis and can be determined through offline training based upon some lab data. An elementary hysteron specific weight $\mu_k$ may be factored for each elementary hysteron, modifying each elementary hysteron to account for actual system inefficiencies and modifying the overall hysteron set for the minimum and maximum values of y(t). The weights may be expressed as an n-dimensional weight vector μ. It should be noted that p does change with temperature and is designated by some in the art as a function of temperature T such as μ(T). Testing performed for training purposes is performed at multiple temperatures to allow for adjustments to temperature within a vehicle. However, once the temperature value is set and the appropriate μ values selected, the output SOC(t) is based only on the input Voc(t) which determines the elementary hysteron states in w independent of temperature. In the vehicle, the battery temperature is measured by a temperature sensor. According to the measured temperature, different values of the weight factor μ may be selected and then applied to the elementary hysteron states. As a result, the calculation for general battery hysteresis, wherein the output is the battery SOC, may be computed by, $$SOC(t)=\mu^T w(t)=\mu_1 w_1 + \mu_2 w_2 + \ldots + \mu_n w_n,$$

where T is the transpose of a vector.

As aforementioned, the number of elementary hysterons drives the resolution of the hysteresis curve generated in the resulting embodiment of the Preisach model. A Preisach model with few elementary hysterons, such as a model as exemplified in FIG. 5, would be impractical to use on a complicated system such as a battery SOC estimation system. Resulting error caused be being on one side of a step pattern or another could result in significantly misjudging the SOC in the battery. As a result, it is highly preferable to use a large number of elementary hysterons in the Preisach model in order to eliminate the step pattern in the resulting hysteresis model. However, applying the abovementioned formula for the SOC, as the number of elementary hysterons increase, the number of hysteron specific weights $\mu_k$ that must be collected and tabulated also increases. These elementary hysterons and their specific weights can be intensive or burdensome to an on-board algorithm and add complexity to the calculations to be carried out in the SOC calculation. It has been found that, in some embodiments, it is preferable to define hysteron groupings ("hysterons") with the state values wk of the elementary hysterons in a group averaged for each grouped hysteron. In this way, the average value of elementary hysteron states within a hysteron may be utilized as an average value. The overall model would retain sensitivity to individual elementary hysterons switching on and off, but with the overall performance of the curve being averaged over some grouped hysterons. Because the values for individual elementary hysterons are averaged into hysterons, this particular embodiment would substitute the number of hysterons for the total number of elementary hysterons in the value of n. The hysterons generate w(t) based upon the elementary hysteron states present within each hysteron, such that $w_k$ for each hysteron constitutes an average of all of the binary hysteron states within that hysteron. Hysteron specific weights $\mu_k$ are then utilized for each hysteron, reducing the burden associated with collecting and tabulating μ and online updating hysteron states. These hysteron specific weights average the weights of the elementary hysterons contained within each hysteron, approximating the effect of the weights within the entire hysteron without requiring the calculation and tabulation of every weight associated with every elementary hysteron.

Figure 14:
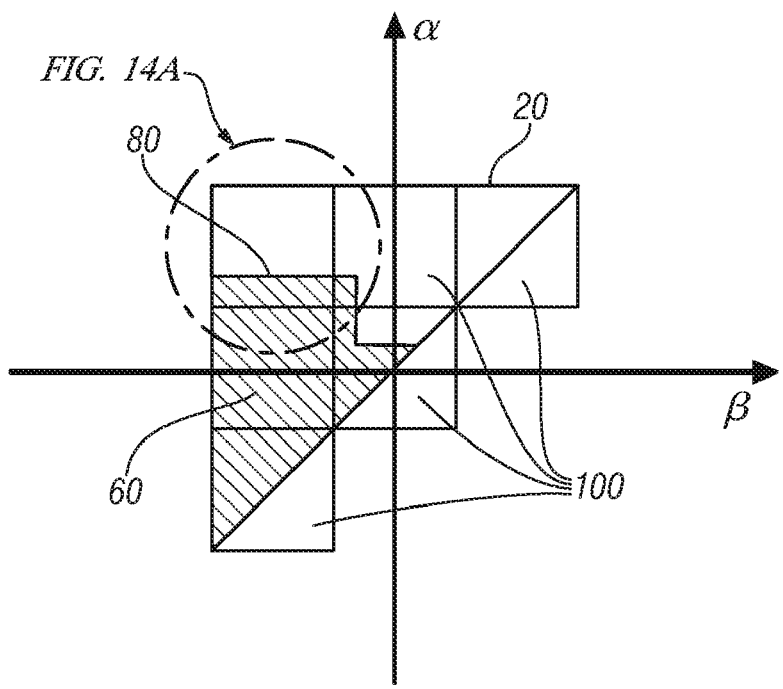
FIG. 14 is a graphical illustration displaying exemplary hysterons in accordance with the disclosure.
Figure 14A:
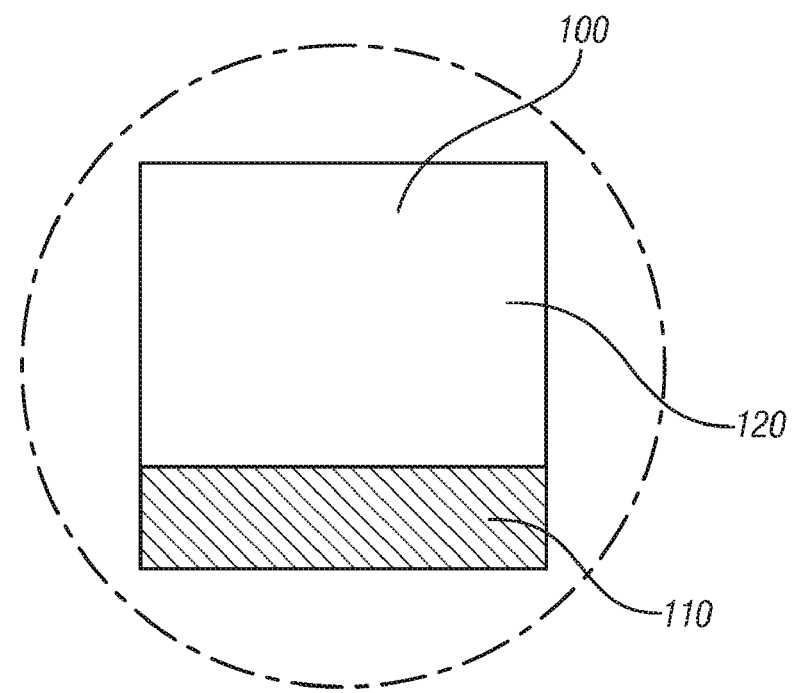
FIG. 14A is a graphical illustration of an exemplary hysteron square as displayed in FIG. 14 in accordance with the disclosure.

The use of hysterons on a memory curve is illustrated in FIG. 14. An exemplary Preisach plane 20 containing many elementary hysterons is pictured. Region 60 (shaded) depicts a zone on Preisach plane 20 in which the elementary hysterons are switched on. Line 80 depicts the boundary of region 60. In the displayed exemplary embodiment, the hysteron take the form of hysteron squares 100. However, it will be appreciated that any shape of hysteron may be used to average the hysteron state data, so long as all of the elementary hysterons are accounted for and the sum of the elementary hysteron states are thus returned for use in the SOC calculation. Hysteron squares 100 are laid over the Preisach plane in a uniform pattern, said hysteron squares being aligned in a matrix having L rows and L columns. FIG. 14A illustrates a close-up of a particular hysteron square 100. The value $w_k$ for this particular hysteron square 100 which will be used in the SOC calculation is determined by computing the difference between the areas of region $A^+$ 110 (shaded) where the elementary hysterons are turned on and region $A^-$ 120 where the elementary hysterons are turned off. Calculating w(t) based upon areas of regions 110 and 120 across hysteron is described in more detail below in relation to FIGS. 16-19. The $w_k$ value for each hysteron square is then coupled with $\mu_k$ for use in the SOC calculation. The resulting SOC calculation retains most of the resolution of the large number of elementary hysterons while reducing the burden of the calculations, data storage, and training associated with applying μ.

Figure 15:
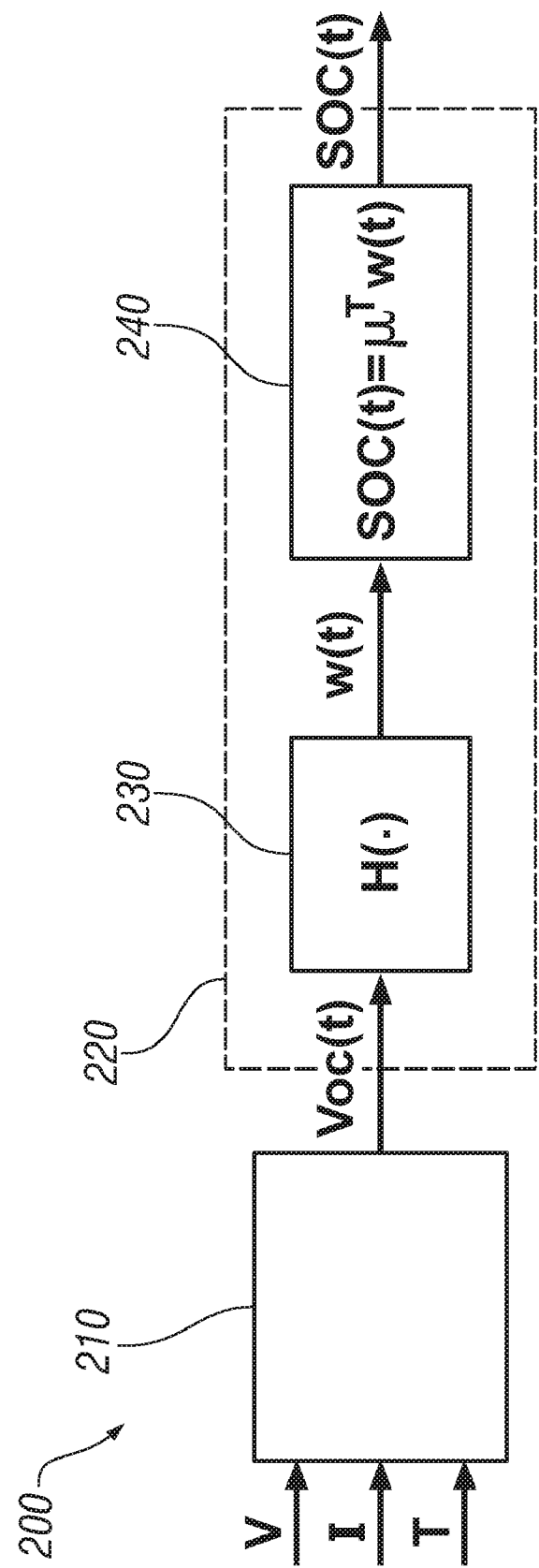
FIG. 15 is a block diagram illustrating an exemplary state of charge estimation process in accordance with the disclosure.

FIG. 15 illustrates an exemplary SOC estimation process 200, wherein data is gathered from the battery system and the hysteresis model is applied to the data to generate the SOC(t) calculation. In this exemplary embodiment, inputs in the form of a battery voltage, a battery current, and a system temperature are fed through battery parameter estimation algorithm 210 in order to generate an estimate of Voc(t). Voc(t) is then fed into estimation algorithm 220, wherein, first, a hysteron calculation process 230 defines w(t) and, second, an SOC calculation process 240 applies μ to w(t) to generate SOC(t). In this way, estimation process 200 takes readily available data from the battery system and generates a hysteresis model-based SOC estimation.

Figure 16:
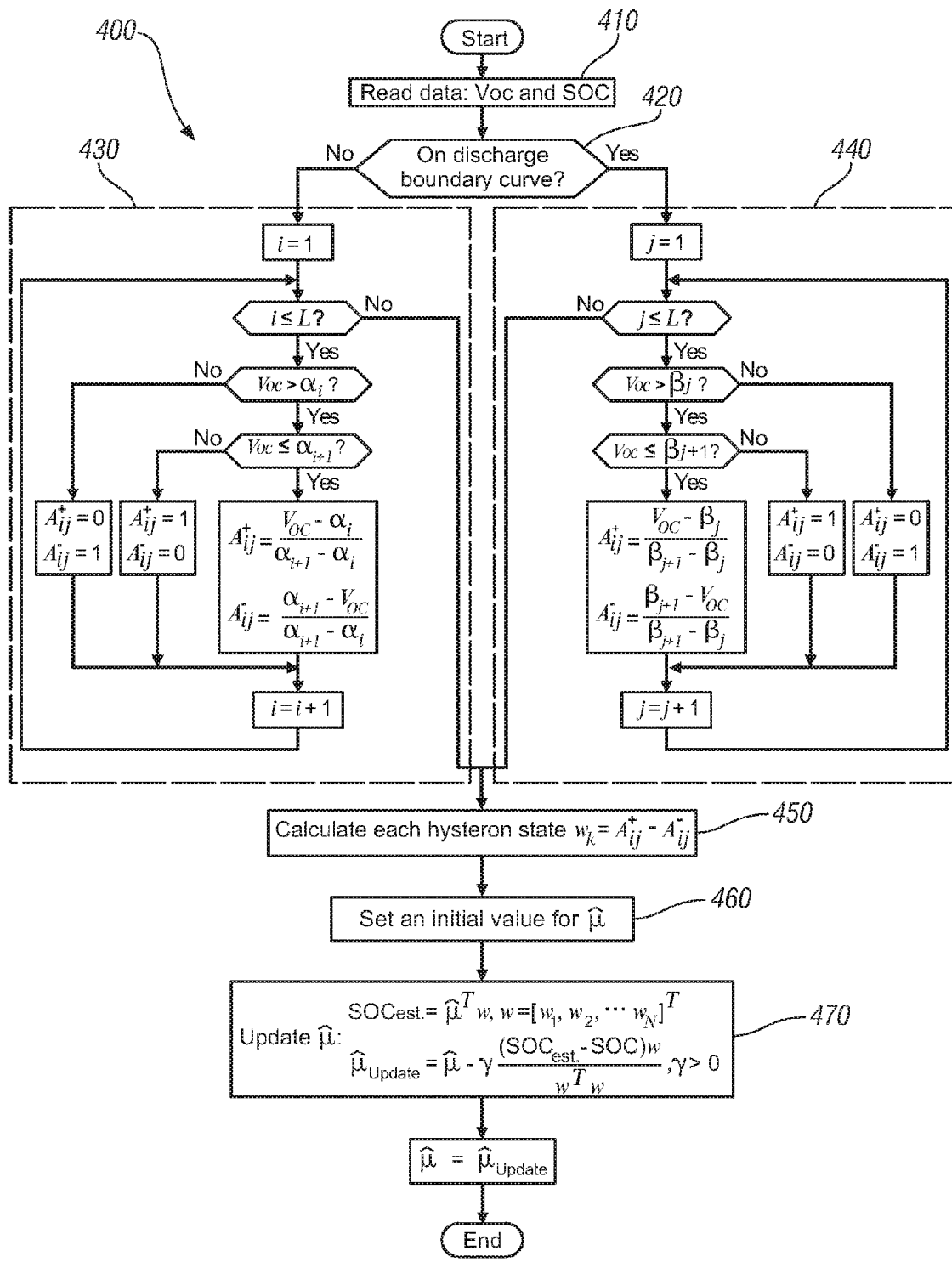
FIG. 16 is a flowchart illustrating an exemplary embodiment of a method used to initialize the process illustrated in FIG. 17 in accordance with the disclosure.
Figure 17:
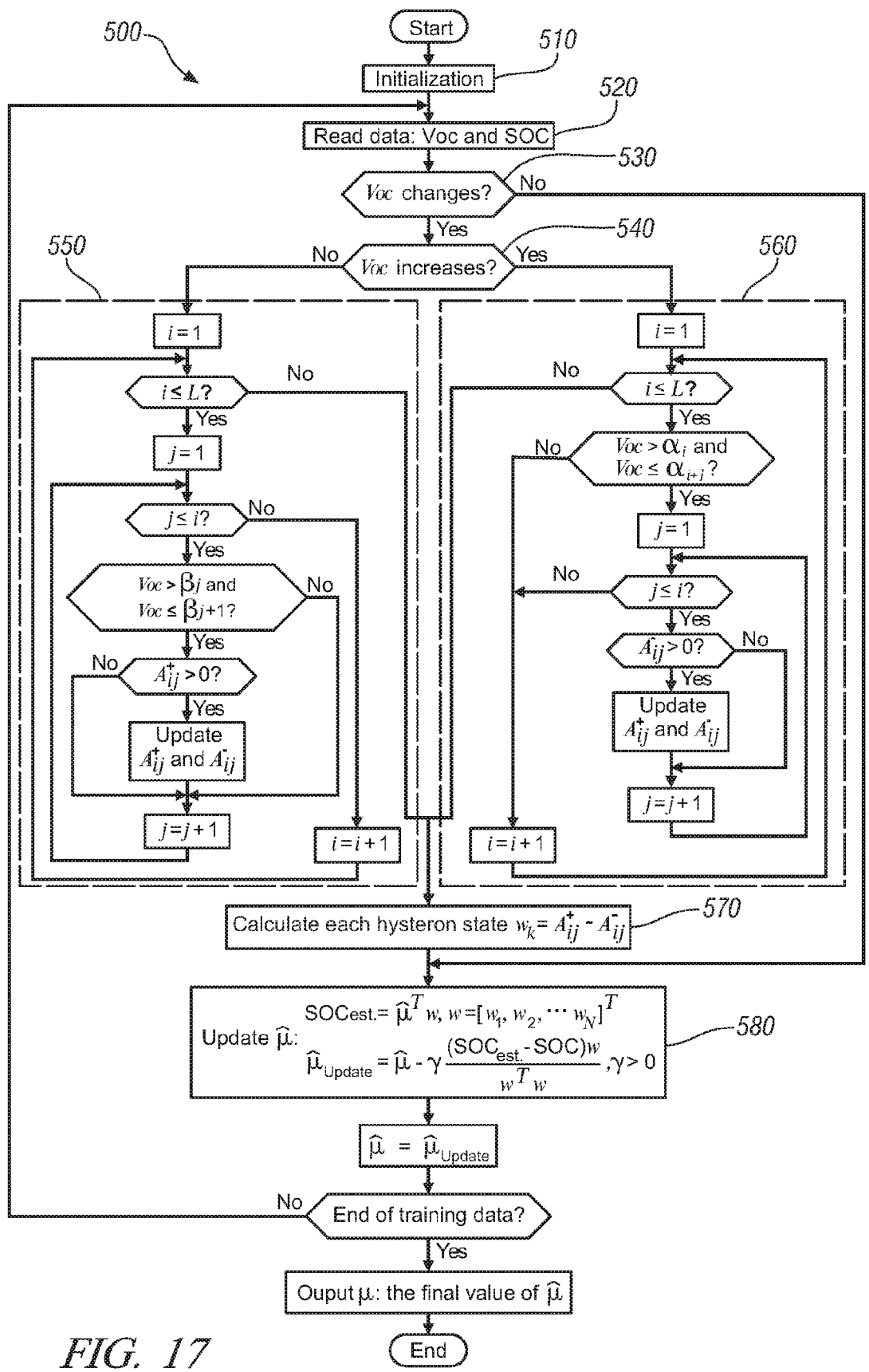
FIG. 17 is a flowchart illustrating an exemplary embodiment of a method used to translate test data into hysteron weights in accordance with the disclosure.
Figure 18:
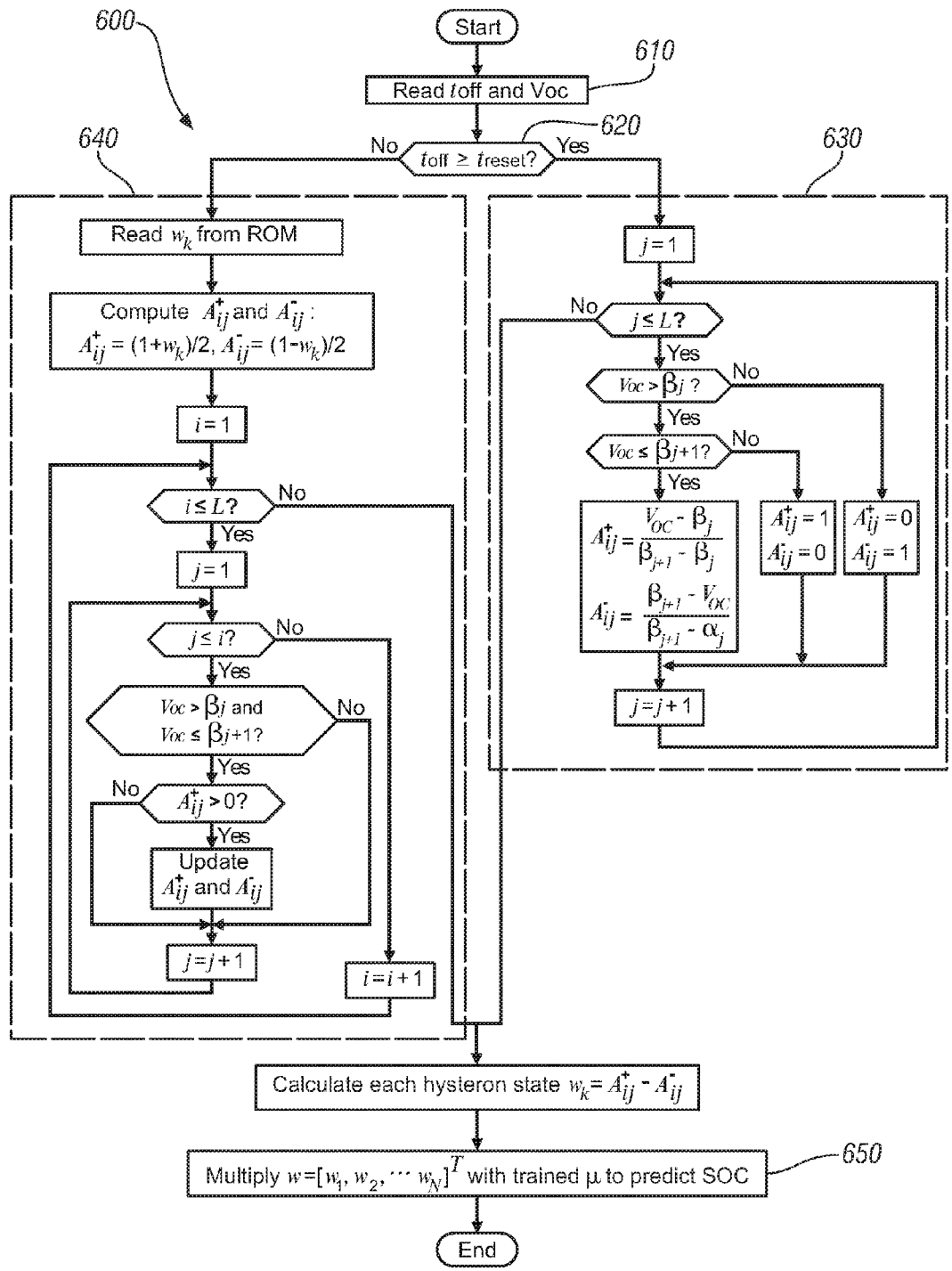
FIG. 18 is a flowchart illustrating an exemplary embodiment of a method used to initialize the process illustrated in FIG. 19 in accordance with the disclosure.
Figure 19:
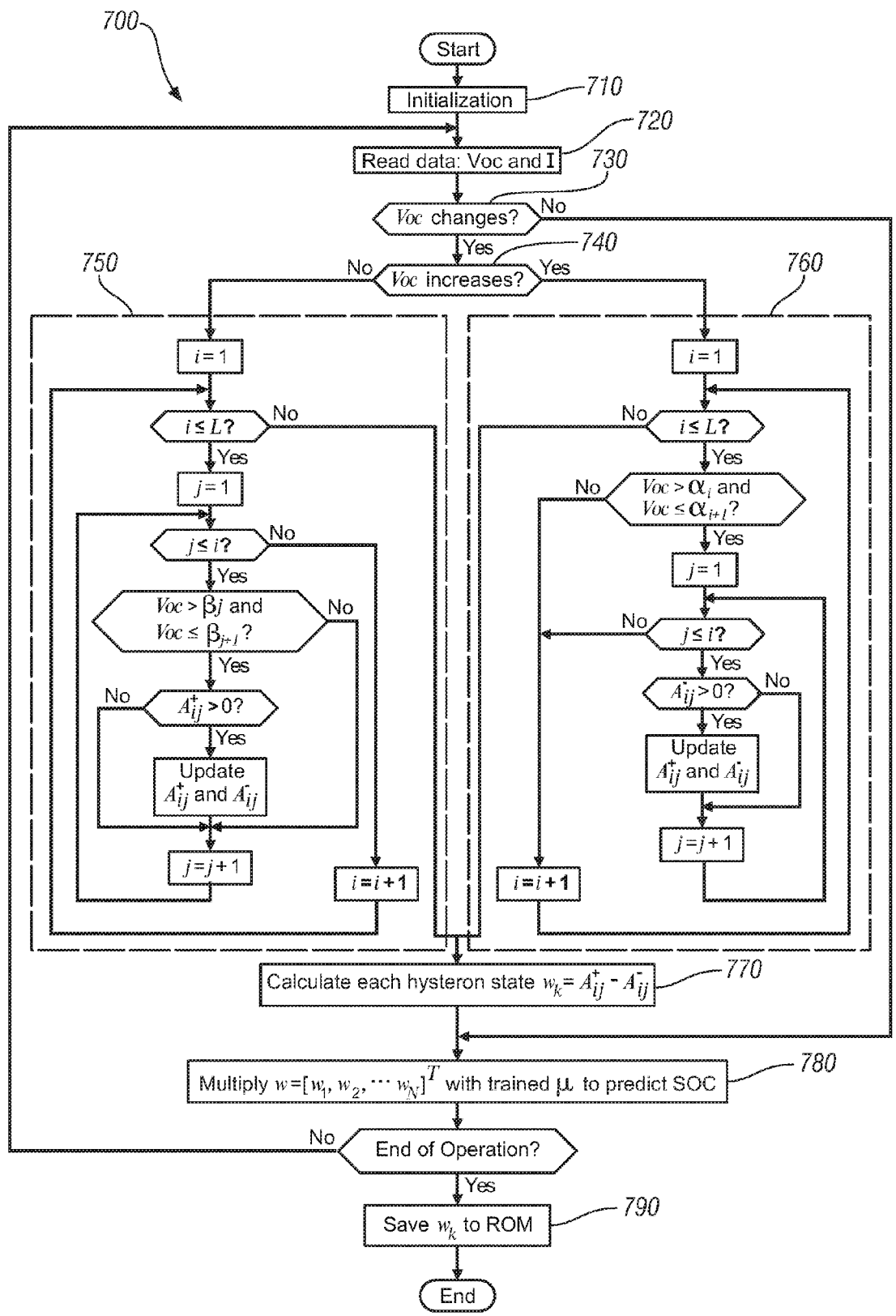
FIG. 19 is a flowchart illustrating an exemplary embodiment of a method used to translate operational data into a state of charge estimation in accordance with the disclosure.

As described in FIG. 15, the SOC estimation algorithm 220 involves first creating w(t) based on the input Voc(t) and then applying the weight vector μ to w(t) to generate SOC(t). As previously mentioned, the weight vector μ must be trained based upon real battery hysteresis data collected from lab in order for a hysteresis-based model to accurately estimate SOC. FIGS. 16-17 describe an exemplary process by which the weight vector μ is trained by real battery hysteresis data. FIGS. 18-19 describe the process by which the weight vector μ, once trained, is applied within the model to perform on-board SOC calculations.

Because hysteresis requires a historical context for the data in order to accurately determine an output, one is required to know an initial starting point of the hysteresis data from which to begin to determine the nature of H(•). For training data collected at lab, we control battery hysteresis starting from either the lowest point (minimum SOC=0%) or the highest point (maximum SOC=100%). FIG. 16 illustrates an exemplary process 400 by which lab data is used to initialize w(t) for the purpose of training weight vector μ. Lab data including a single Voc data point and a corresponding actual SOC measurement is collected at step 410. Step 420 determines whether the data point collected indicates that the model is operating at one boundary condition (discharge boundary, i.e., boundary decreasing from maximum SOC), and if so, steps within block 440 are used to determine the initial hysteron states for this data point. If the data point collected indicates that the model is operating at another boundary condition (charging boundary, i.e., boundary increasing from minimum SOC), steps within block 430 are used to determine the initial hysteron states for the data point. Both block 430 and block 440 perform iterative calculations, systematically analyzing the matrix of hysterons by row i and column j and determining $A^+$ and $A^-$ for each hysteron to determine $w_k$ at step 450. An initial value for $\hat{\mu}$, a working estimate for μ, is selected at step 460 and applied at step 470. Step 470 applies the SOC calculation to generate an estimated SOC value ($SOC_{est}$) and provides an initial correction for $\hat{\mu}$ based upon comparing $SOC_{est}$ to the sample of actual SOC. Process 400 sets a framework for initializing w(t) and sets a first point on an H(•) graph as illustrated in FIG. 11 in order to set a historical context for the analysis of later points.

Once an initial relationship of Voc(t) and SOC(t) are determined through a first data point, additional data points can be utilized to begin mapping the H(•) and calculate μ. FIG. 17 illustrates an exemplary process 500 by which lab data is used in conjunction with the initial information gained in process 400 to map the relationship of Voc(t) to SOC(t) for a given system and thereby derive values for μ. Step 510 receives the outputs from the initialization process 400. Step 520 receives inputs from test data related to Voc and corresponding actual SOC measurements. Steps 530 and 540 evaluate the presently input Voc estimate and compare it to the last Voc estimate, which on the first iteration of process 500 is the first Voc estimate used in the initialization process 400. If Voc is unchanged, then w(t) remains unchanged. If Voc decreases, steps within block 550 perform iterative steps in order to define hysteron states for use in step 570 to define w(t). If Voc increases, steps within block 560 perform iterative steps in order to define hysteron states for use in step 570 to define w(t). Step 580 applies the SOC calculation to generate $SOC_{est}$ and provides a correction for $\hat{\mu}$ based upon comparing $SOC_{est}$ to the sample of actual SOC. Steps 520 through 580 repeat for every available data point, each iteration refining the values for $\hat{\mu}$. Once all of the data points have been evaluated, μ is trained with the values of $\hat{\mu}$ and the training process is complete. It should be noted that lab data will most effectively estimate μ when the test data thoroughly captures both boundary conditions and loops internal to the boundary conditions.

Once trained, μ may be used in vehicles with similar battery configurations as the system which generated the lab data for training the model. The process for on-board estimation of SOC is similar to the process used to train the model, in that first w(t) must be initialized and then μ may be applied in the SOC calculation to create an SOC estimation. FIG. 18 illustrates initialization process 600 exemplifying an on-board method whereby initial w(t) values are set. Values for w(t) may be able to be based upon w(t) values from past operation cycles. During key-off cycles, a battery may for a time reasonably retain an internal state; as time increases since the last key-off event, the internal chemistry of the battery may change, thereby altering the properties inherent to describing the battery through the hysteresis model. As a result, process 600 measures at step 610 the time since the last key-off event $t_{off}$ in addition to gathering a Voc estimate. Step 620 compares $t_{off}$ to some selected critical key-off time, $t_{reset}$. If $t_{off}$ exceeds $t_{reset}$, then w(t) is reset to indicate battery hysteresis starts from the discharge boundary in steps within block 630, similar to the steps within block 440 of FIG. 16. If $t_{off}$ is less than $t_{reset}$, then steps within block 640 use the last w(t) as a baseline to calculate an updated w(t). Step 650 then uses w(t) to calculate an initial SOC estimate.

FIG. 19 illustrates process 700 exemplifying an on-board method to determine an SOC(t) estimate on the basis of a Voc(t) input. Step 710 receives outputs in the form of w(t) from the initialization process 600. Step 720 receives inputs of Voc(t) and I. Steps 730 and 740 determine the state of Voc(t) for the battery to determine whether the battery is charging, discharging, or in a rest state. If Voc(t) remains static, then the hysterons and the estimated SOC(t) will remain static. If Voc(t) is changing, then the SOC(t) will correspondingly increase or decrease. Steps within blocks 750 and 760 calculate w(t) corresponding to a change in Voc(t), and the resulting w(t) is utilized in step 770 with the trained values of μ to calculate an SOC(t) estimate. Step 780 determines whether the battery continues to operate and whether to drive another iteration of process 700 in order to calculate a new SOC(t) estimate. If operation ends, step 790 saves the values for w(t) in a memory location for later use in process 600 as described above.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method of battery state of charge estimation for a battery within a vehicle considering battery hysteresis behavior in an on-board vehicle system comprising:
   executing within the on-board vehicle system an algorithm based on the Preisach-model to calculate the battery state of charge as a function of received data inputs comprising an open circuit voltage and a temperature measured by a temperature sensor, executing the algorithm comprising:
      defining a plurality of elementary hysterons considering minimum and maximum values of the state of charge for said battery, wherein the elementary hysterons describe the battery hysteresis behavior and each of the elementary hysterons comprises a binary output depending upon historical operation of the battery based upon the Preisach model;
      training a plurality of sets of elementary hysteron specific weights at a plurality of temperatures;
      utilizing the plurality of elementary hysterons;
      selecting one of the sets of elementary hysteron specific weights based upon the measured temperature; and
      utilizing the selected set of elementary hysteron specific weights, wherein one of the elementary hysteron specific weights of the selected set is utilized for each of the plurality of elementary hysterons modifying an effect of each of the binary outputs; and
      applying the received data inputs to said algorithm;
   wherein the executing the algorithm within the on-board vehicle system comprises utilizing the plurality of elementary hysterons and the elementary hysteron specific weights stored in memory of the on-board vehicle system.

2. The method of claim 1, wherein the elementary hysteron specific weights are initially trained.

3. A method of battery state of charge estimation for a battery within a vehicle considering battery hysteresis behavior in an on-board vehicle system comprising:
   executing within the on-board vehicle system an algorithm based on the Preisach-model to calculate the battery state of charge as a function of received data inputs comprising an open circuit voltage and a temperature measured by a temperature sensor, executing the algorithm comprising:
      defining a plurality of elementary hysterons considering minimum and maximum values of the state of charge for said battery, wherein the elementary hysterons describe the battery hysteresis behavior and each of the elementary hysterons comprises a binary output depending upon historical operation of the battery based upon the Preisach model;
      training a plurality of sets of elementary hysteron specific weights at a plurality of temperatures;
      utilizing the plurality of elementary hysterons;
      selecting one of the sets of elementary hysteron specific weights based upon the measured temperature;
      utilizing the selected set of elementary hysteron specific weights, wherein one of the elementary hysteron specific weights of the selected set is utilized for each of the plurality of elementary hysterons modifying an effect of each of the binary outputs; and
      applying the received data inputs to said algorithm;
   wherein the executing the algorithm within the on-board vehicle system comprises utilizing the plurality of elementary hysterons and the elementary hysteron specific weights stored in memory of the on-board vehicle system;
   wherein the elementary hysteron specific weights are initially trained; and
   wherein said training comprises processing test data gathered by cycling a test battery, said cycling operative to capture a boundary hysteresis loop and internal hysteresis loops.

4. The method of claim 3, wherein said open circuit voltage is estimated from parameters available while said battery is in a state of charge or discharge.

5. The method of claim 4, wherein the parameters comprise a battery voltage and a battery current.

6. A method of battery state of charge estimation for a battery within a vehicle considering battery hysteresis behavior in an on-board vehicle system comprising:
   executing within the on-board vehicle system an algorithm based on the Preisach-model to calculate the battery state of charge as a function of received data inputs comprising an open circuit voltage, executing the algorithm comprising:
      defining a basic hysteresis curve characterized in said Preisach-model comprising a plurality of elementary hysterons describing the battery hysteresis behavior, wherein each of the elementary hysterons describes a binary output depending upon historical operation of the battery based upon the Preisach model;

weighting said basic hysteresis curve with elementary hysteron specific weights based upon training data, wherein one of the elementary hysteron specific weights is utilized for each of the plurality of elementary hysterons modifying an effect of each of the binary outputs;

shifting said basic hysteresis curve in order to match an output range of said algorithm to a range of actual battery states of charge; and applying the received data inputs to said algorithm, comprising;

utilizing the plurality of elementary hysterons; and utilizing the elementary hysteron specific weights;

wherein the executing the algorithm within the on-board vehicle system comprises utilizing the plurality of elementary hysterons and the elementary hysteron specific weights stored in memory of the on-board vehicle system.

7. The method of claim 6, wherein said training data comprises test data gathered by cycling a test battery, said cycling operative to capture a boundary hysteresis loop and internal hysteresis loops.

8. The method of claim 6, wherein said range of actual battery states of charge comprise a maximum value corresponding to a state of charge for a fully charged battery and a minimum value corresponding to a state of charge for a fully discharged battery.

9. The method of claim 8, wherein said open circuit voltage is estimated from parameters available while said battery is in a state of charge or discharge.

10. The method of claim 9, wherein the parameters include a battery voltage, a battery current, and a temperature measured by a temperature sensor.

* * * * *